US012579024B1

(12) United States Patent
Segal et al.

(10) Patent No.: US 12,579,024 B1
(45) Date of Patent: Mar. 17, 2026

(54) TECHNIQUES FOR CODE INTENT DISCOVERY

(71) Applicant: Wiz, Inc., New York, NY (US)

(72) Inventors: Assaf Segal, Tel Aviv (IL); Ami Luttwak, Binyamina (IL); Amir Lande Blau, Tel Aviv (IL); Arnon Trabelsi, Tel Aviv (IL); Alon Schindel, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/216,285

(22) Filed: May 22, 2025

(51) Int. Cl.
*G06F 11/07* (2006.01)
*G06F 21/56* (2013.01)

(52) U.S. Cl.
CPC ........ *G06F 11/0793* (2013.01); *G06F 21/563* (2013.01)

(58) Field of Classification Search
CPC ........................... G06F 11/0793; G06F 21/563
See application file for complete search history.

(56) References Cited

U.S. PATENT DOCUMENTS

| | | | |
|---|---|---|---|
| 6,532,588 B1 * | 3/2003 | Porter ........................ | G06F 8/71 707/999.203 |
| 10,038,707 B2 | 7/2018 | Muddu et al. | |
| 10,476,898 B2 | 11/2019 | Muddu et al. | |
| 11,683,333 B1 | 6/2023 | Dominessy et al. | |
| 12,278,825 B2 | 4/2025 | Fogel et al. | |

| | | | |
|---|---|---|---|
| 2009/0210852 A1 * | 8/2009 | Martineau ................. | G06F 8/71 717/101 |
| 2011/0047618 A1 * | 2/2011 | Evans .................... | G06F 21/566 726/23 |
| 2013/0333033 A1 * | 12/2013 | Khesin .................... | G06F 21/55 726/23 |
| 2017/0180399 A1 * | 6/2017 | Sukhomlinov ..... | H04L 63/1425 |
| 2019/0179686 A1 * | 6/2019 | Craik .................... | G06F 21/128 |
| 2021/0200870 A1 * | 7/2021 | Yavo .................... | H04L 63/1416 |
| 2022/0198011 A1 * | 6/2022 | Kumar .................. | G06F 21/554 |
| 2023/0161870 A1 | 5/2023 | Herzberg et al. | |

OTHER PUBLICATIONS

Melski et al., "Static Analysis of Software Executables", Mar. 2009, Cybersecurity Applications & Technology Conference for Homeland Security, pp. 97-102 (Year: 2009).*

* cited by examiner

*Primary Examiner* — Kenneth W Chang
(74) *Attorney, Agent, or Firm* — M&B IP Analysts, LLC

(57) ABSTRACT

A system and method for detecting code intent of code objects in a computing environment for assessing cybersecurity risk is presented. The method includes detecting a plurality of code objects in a computing environment; statically analyzing each code object of the plurality of code objects to determine a plurality of potential intents, each potential intent corresponding to an action; generating a cybersecurity signal in the computing environment based on a plurality of event records; detecting in the cybersecurity signal a first event corresponding to a potential intent; determining that the potential intent is a code intent based on the detection; detecting in the cybersecurity signal a second event which does not correspond to any potential intent; and initiating a remediation action in the computing environment based on the detected second event.

19 Claims, 6 Drawing Sheets

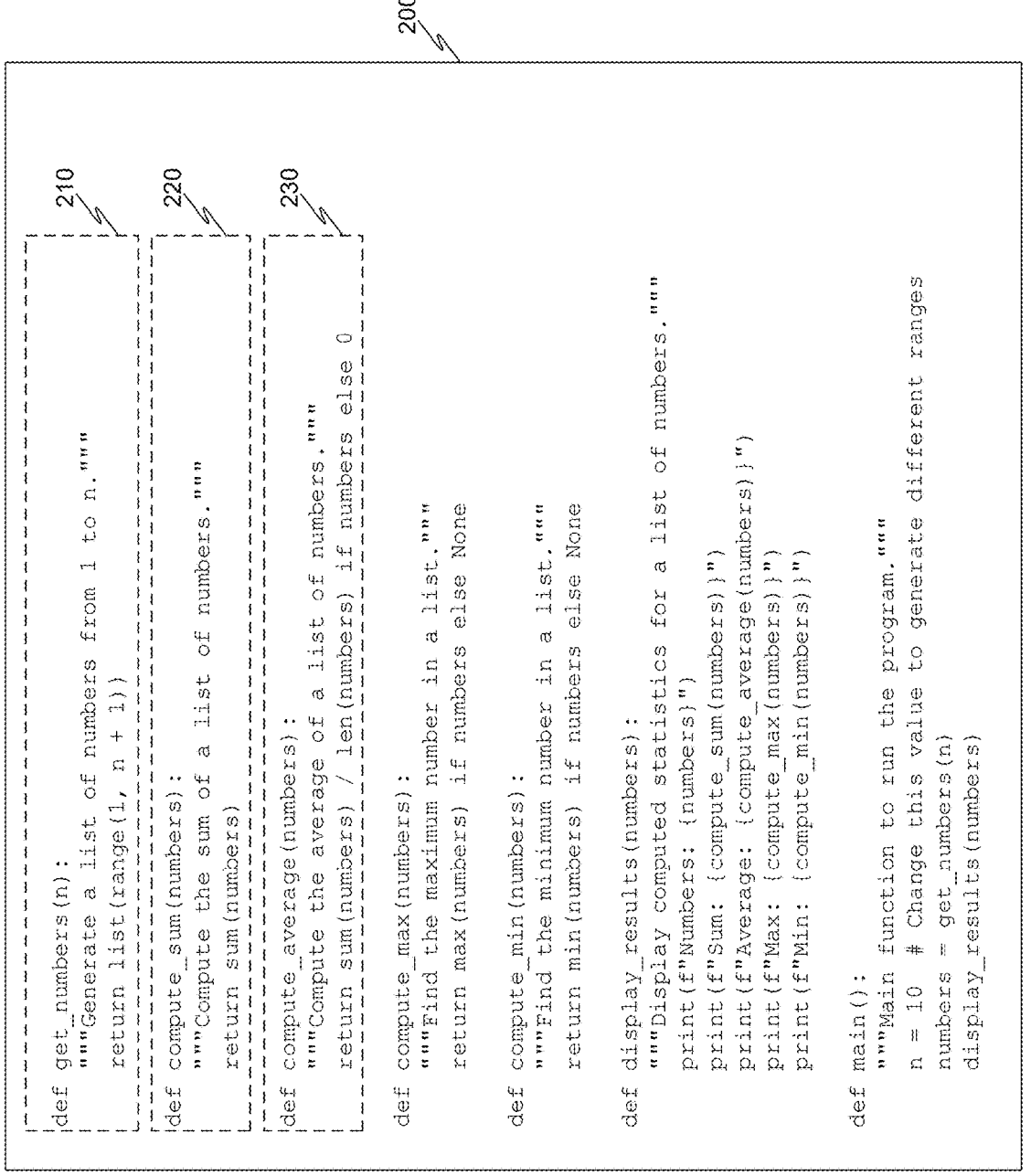

```
def get_numbers(n):
    """Generate a list of numbers from 1 to n."""
    return list(range(1, n + 1))

def compute_sum(numbers):
    """Compute the sum of a list of numbers."""
    return sum(numbers)

def compute_average(numbers):
    """Compute the average of a list of numbers."""
    return sum(numbers) / len(numbers) if numbers else 0 def compute_max(numbers):
    """Find the maximum number in a list."""
    return max(numbers) if numbers else None def compute_min(numbers):
    """Find the minimum number in a list."""
    return min(numbers) if numbers else None def display_results(numbers):
    """Display computed statistics for a list of numbers."""
    print(f"Numbers: {numbers}")
    print(f"Sum: {compute_sum(numbers)}")
    print(f"Average: {compute_average(numbers)}")
    print(f"Max: {compute_max(numbers)}")
    print(f"Min: {compute_min(numbers)}")

def main():
    """Main function to run the program."""
    n = 10  # Change this value to generate different ranges
    numbers = get_numbers(n)
    display_results(numbers)
```

START

S510

DETECT A PLURALITY OF CODE OBJECTS IN A CLOUD
COMPUTING ENVIRONMENT

S520

PERFORM STATIC ANALYSIS ON EACH CODE OBJECT TO
DETERMINE A POTENTIAL INTENT

S530

DETERMINE AN INTENT BASED ON A POTENTIAL INTENT AND
AT LEAST ANOTHER SIGNAL FROM THE CLOUD COMPUTING
ENVIRONMENT

END

TECHNIQUES FOR CODE INTENT DISCOVERY

TECHNICAL FIELD

The present disclosure relates generally to cybersecurity, and specifically to techniques for discovering code intent and functionality to detect cybersecurity threats.

BACKGROUND

Deploying code into a computing environment inherently introduces cybersecurity risks due to the complex interplay between software, infrastructure, and potential threat actors. As code transitions from development to production, it often interacts with various systems, services, and networks, each a potential vector for exploitation. One core risk lies in the exposure of vulnerabilities within the code itself, such as insecure functions, poor error handling, or unchecked user input, which can lead to serious issues like remote code execution or privilege escalation.

Common pitfalls during deployment further amplify these risks. Inadequate authentication or authorization mechanisms may inadvertently grant users access to sensitive parts of the application or infrastructure. This is problematic when deploying with default or hardcoded credentials, or when access control is misconfigured. Mismanagement of secrets and credentials, such as storing API keys or database passwords in source code, can also result in unauthorized access if those values are leaked or exposed through repositories or logs.

Another frequent issue arises from insufficiently secured APIs and endpoints. These interfaces, if not properly validated and restricted, may allow attackers to manipulate inputs or query data in unintended ways. Additionally, relying on outdated libraries or components during deployment introduces the risk of known vulnerabilities being exploited, particularly if these components are publicly accessible or widely used.

The deployment process itself can become a point of vulnerability. Improperly configured cloud services, container orchestration platforms, or CI/CD pipelines may open up pathways for attackers to interfere with the environment or intercept data. Furthermore, logging and monitoring mechanisms, if not carefully managed, might expose sensitive information or provide inadequate visibility into security events, delaying detection and response.

Even well-written code may behave unpredictably in a new environment if dependencies differ, leading to unforeseen vulnerabilities. The operational context, including network architecture, user behavior, data sensitivity, etc., can significantly influence risk, especially when security considerations are not integrated into deployment planning.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a plurality of code objects in a computing environment. The method may also include statically analyzing each code object of the plurality of code objects to determine a plurality of potential intents, each potential intent corresponding to an action. The method may furthermore include generating a cybersecurity signal in the computing environment based on a plurality of event records. The method may in addition include detecting in the cybersecurity signal a first event corresponding to a potential intent. The method may moreover include determining that the potential intent is a code intent based on the detection. The method may also include detecting in the cybersecurity signal a second event which does not correspond to any potential intent. The method may furthermore include initiating a remediation action in the computing environment based on the a detected second event. Other embodiments of this aspect include corresponding computer systems, apparatus, and computer programs recorded on one or more computer storage devices, each configured to perform the actions of the methods.

Implementations may include one or more of the following features. The method may include: detecting the plurality of code objects in a code repository of the computing environment, where the code repository is configured to store a plurality of versions of each code object. The method may include: generating a call graph based on the static analysis of each code object of the plurality of code objects. The method may include: receiving an event from a runtime sensor, the runtime sensor deployed on a resource and configured to detect runtime event data on the resource; and generating the cybersecurity signal based on the received event. The method may include: detecting an event in a log of the computing environment; and generating the cybersecurity signal based on the detected event. The method where the log is any one of: a cloud log, a network log, an event log, a runtime execution log, or any combination thereof. The method may include: detecting a resource in the computing environment, where the resource utilizes an application, the application based on a code object of the plurality of code objects; determining that the second event is associated with the application based on an identifier of the application in a record of the second event; and determining that the second event does not correspond to any potential intent associated with the code object of the application. The method may include: initiating the remediation action based on the application. The method may include: initiating the remediation action on the resource. Implementations of the described techniques may include hardware, a method or process, or a computer tangible medium.

In one general aspect, a non-transitory computer-readable medium may include one or more instructions that, when executed by one or more processors of a device, cause the device to: detect a plurality of code objects in a computing environment; statically analyze each code object of the plurality of code objects to determine a plurality of potential intents, each potential intent corresponding to an action; generate a cybersecurity signal in the computing environment based on a plurality of event records; detect in the cybersecurity signal a first event corresponding to a potential intent; determine that the potential intent is a code intent based on the detection; detect in the cybersecurity signal a second event which does not correspond to any potential intent; and initiate a remediation action in the computing environment based on the a detected second event. Other embodiments of this aspect include corresponding computer systems, apparatus, and computer programs recorded on one or more computer storage devices, each configured to perform the actions of the methods.

In one general aspect, a system may include one or more processors processing circuitries configured to: The system may also detect a plurality of code objects in a computing environment. The system may furthermore statically analyze each code object of the plurality of code objects to determine a plurality of potential intents, each potential intent corresponding to an action. The system may in addition generate a cybersecurity signal in the computing environment based on a plurality of event records. The system may moreover detect in the cybersecurity signal a first event corresponding to a potential intent. The system may also determine that the potential intent is a code intent based on the detection. The system may furthermore detect in the cybersecurity signal a second event which does not correspond to any potential intent. The system may in addition initiate a remediation action in the computing environment based on the a detected second event. Other embodiments of this aspect include corresponding computer systems, apparatus, and computer programs recorded on one or more computer storage devices, each configured to perform the actions of the methods.

Implementations may include one or more of the following features. The system where the one or more processing circuitries are further configured to: detect the plurality of code objects in a code repository of the computing environment, where the code repository is configured to store a plurality of versions of each code object. The system where the one or more processing circuitries are further configured to: generate a call graph based on the static analysis of each code object of the plurality of code objects. The system where the one or more processing circuitries are further configured to: receive an event from a runtime sensor, the runtime sensor deployed on a resource and configured to detect runtime event data on the resource; and generate the cybersecurity signal based on the received event. The system where the one or more processing circuitries are further configured to: detect an event in a log of the computing environment; and generate the cybersecurity signal based on the detected event. The system where the log is any one of: a cloud log, a network log, an event log, a runtime execution log, or any combination thereof. The system where the one or more processing circuitries are further configured to: detect a resource in the computing environment, where the resource utilizes an application, the application based on a code object of the plurality of code objects; determine that the second event is associated with the application based on an identifier of the application in a record of the second event; and determine that the second event does not correspond to any potential intent associated with the code object of the application. The system where the one or more processing circuitries are further configured to: initiate the remediation action based on the application. The system where the one or more processing circuitries are further configured to: initiate the remediation action on the resource. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example code object for detecting intent, utilized to describe an embodiment.

DETAILED DESCRIPTION

Figure 1:
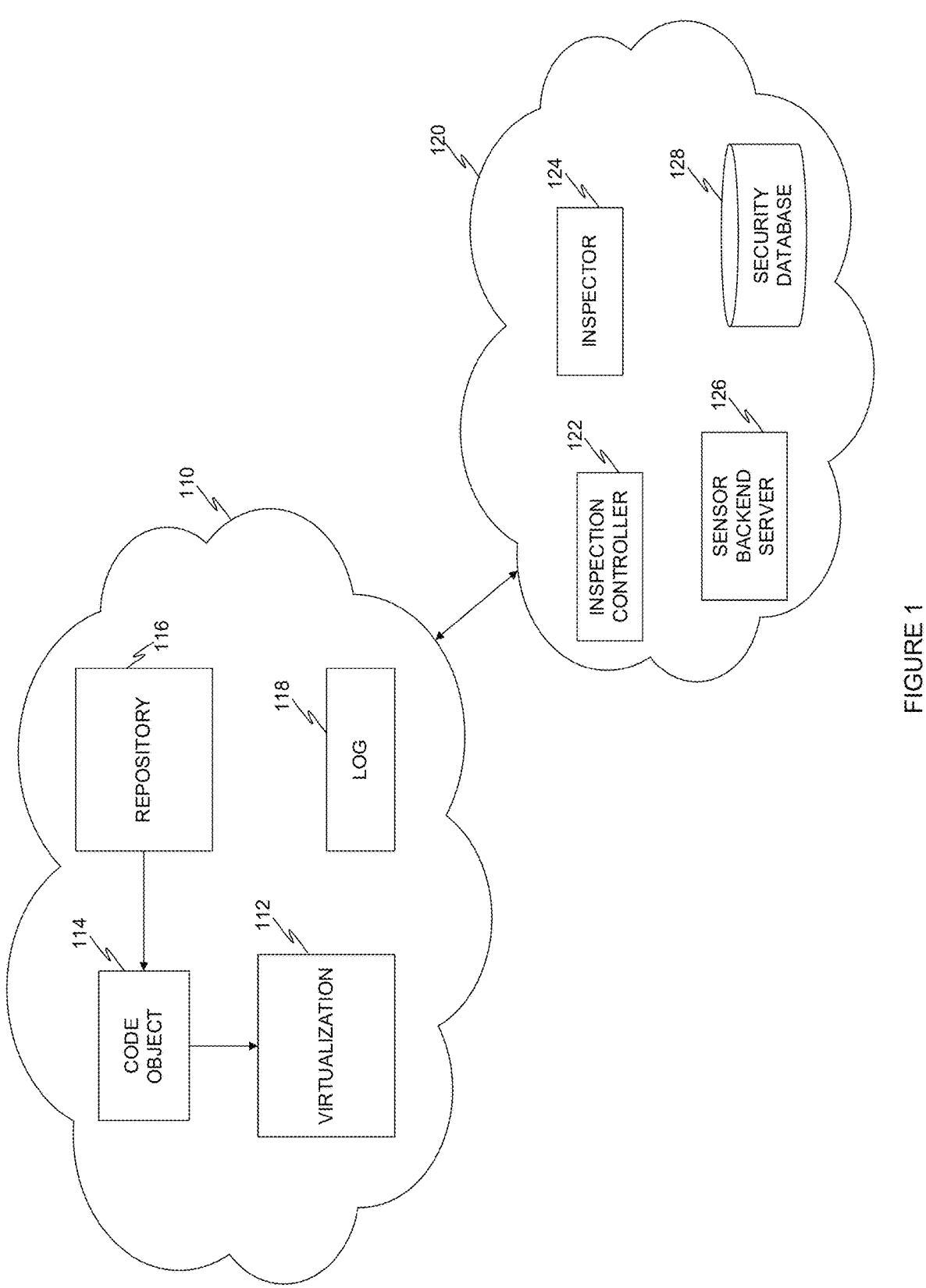
FIG. 1 is an example of a cloud computing environment deploying thereon virtualizations based on code objects, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example of a cloud computing environment deploying thereon virtualizations based on code objects, utilized to describe an embodiment. According to an embodiment, a computing environment 110 is a cloud computing environment, an on-prem computing environment, a networked computing environment, a hybrid computing environment, a combination thereof, and the like.

In an embodiment, a computing environment 110 includes a Virtual Private Cloud (VPC), a virtual network (VNet), a virtual private network (VPN), a subnet, a mask, a combination thereof, and the like. In certain embodiments, a cloud computing environment is deployed on a cloud computing infrastructure. A cloud computing infrastructure may be, for example, Amazon® Web Services (AWS), Google® Cloud Platform (GCP), Microsoft® Azure, and the like.

In certain embodiments, the computing environment 110 includes a plurality of virtualizations such as virtualization 112. In an embodiment, a virtualization 112 is a virtual machine, a software container, a serverless function, a combination thereof (e.g., a nested virtualization), and the like. A virtual machine is implemented utilizing Oracle®

VirtualBox, a software container is implemented utilizing a Docker® Platform, Kubernetes® platform, and the like, and a serverless function is implemented utilizing Amazon Lambda, according to some embodiments.

In an embodiment, a virtualization 112 is deployed in the computing environment 110 based on a code object 114. For example, in an embodiment, a code object 114 is accessed from a repository 116. In an embodiment, the code object 114 is deployed into a virtualization through a CI/CD pipeline, by an orchestrator of a cloud computing environment, by an infrastructure as code (IaC) system (e.g., Terraform®), through a software container platform, a combination thereof, and the like.

According to an embodiment, a code object 114 is a file, a machine readable code, a human readable code, a declaratory code, a combination thereof, and the like. In an embodiment, the code object 114 includes a plurality of code lines. In certain embodiments, the code object 114 is stored in a repository 116. In some embodiments, the repository 116 is a private repository, a public repository, and the like.

In an embodiment, a repository 116 includes code objects, software applications, binaries, software libraries, a software image, a combination thereof, and the like. In some embodiments, the repository 116 includes a version control system (VCS), such as Git®. In an embodiment, a user account of the computing environment 110 is configured to access the repository 116 and select a code object for deployment into a virtualization.

In certain embodiments, the computing environment 110 further includes a log 118. In an embodiment, the log 118 is a cloud log, a network log, an event log, an access log, a combination thereof, and the like. According to an embodiment, a log 118 is utilized to store data records, each data record corresponding to an event. For example, a first event is a user account having a certain identifier initiates deployment of a code object through a CI/CD pipeline. A second event may be, for example, deployment of the code object as the virtualization. A third event may be, for example, a network access request initiated by the virtualization.

In an embodiment, the computing environment 110 is monitored by an inspection environment 120. According to an embodiment, the inspection environment 120 includes an inspection controller 122, an inspector 124, a sensor backend server 126, and a security database 128. In an embodiment, the inspection controller 122 is configured to initiate inspection of the computing environment 110 for cybersecurity threats, cybersecurity risks, misconfigurations, exposures, vulnerabilities, a combination thereof, and the like.

In some embodiments, the inspection controller 122 is configured to provision inspector workloads, such as inspector 124. According to an embodiment, an inspector 124 is configured to detect cybersecurity objects in a virtualization 112. In some embodiments, the inspector 124 is configured to access a code object 114 and perform static analysis on the code object 114. In certain embodiments, the inspector 124 is configured to access the repository 116 to detect code objects stored thereon and inspect the code objects for cybersecurity objects, initiate static analysis on the detected code objects, etc.

In certain embodiments, the inspector 124 is configured to statically analyze a code object 114 to determine an intent of the code object 114. In an embodiment, intent includes actions, functions, calls, a combination thereof, etc., which the code, when executed, is configured to perform. For example, in an embodiment, an inspector 124 is configured to detect a code in the code object 114 which calls an API command at a certain domain, IP address, URL, etc.

In an embodiment, the inspector 124 is configured to inspect an inspectable disk. In some embodiments, the virtualization 112 includes an original disk. In an embodiment, the inspection controller 122 is configured to generate an inspectable disk, for example a cloned disk, based on the original disk. In certain embodiments, the inspectable disk is inspected for cybersecurity objects, is statically analyzed, etc., in place of performing the same actions on the original disk. This allows the original disk to remain unperturbed in a production environment, for example.

In some embodiments, a sensor backend server 126 is configured to receive detections, runtime execution data, a combination thereof, and the like, from sensor applications deployed on virtualizations, such as virtualization 112, in the computing environment 110.

In an embodiment, a sensor, discussed in more detail below, is configured to passively listen on a data link layer of a virtualization 112 and detect events, runtime data, processes, threads, etc., which are executed on the virtualization 112. In an embodiment, the sensor is configured to include a rule engine, detection engine, etc., which applies a rule to an event to generate a detection result. In an embodiment, the sensor provides runtime data, while the inspector 124 provides static analysis, to provide together a better cybersecurity coverage.

In an embodiment, inspection results, detections, forensic findings, etc., are stored in a security database 128. In some embodiments, the security database 128 includes a representation of the computing environment 110. In some embodiments, the representation is generated based on a unified data schema, such that a plurality of computing environments, for example deployed on different cloud computing infrastructures, are all represented utilizing the single unified data schema. In some embodiments, the representation includes a representation of a resource (e.g., virtualization 112), a representation of a code object 114, a representation of a principal (e.g., a user account configured to access the code object 114), a representation of a remediation action, a representation of a cybersecurity issue, a representation of a cybersecurity threat, a representation of an enrichment, a representation of an API endpoint, a representation of an endpoint, a representation of a network object, a representation of a network path, a representation of a cybersecurity object, a combination thereof, and the like.

In some embodiments, the security database 128 is further configured to store a relationship between representation, e.g., 'can access', 'is owner', 'is parent', 'is child', etc. In an embodiment, the security database 128 is implemented utilizing a graph database, a tabular database, a columnar database, a combination thereof, and the like. In some embodiments, the security database is configured to generate a federated query across multiple representations stored thereon.

FIG. 2 is an example code object for detecting intent, utilized to describe an embodiment. In an embodiment, a code object 200 includes a plurality of code blocks. In an embodiment, a code block is a contained code, such as a function. In an embodiment, the code object includes a plurality of code blocks 210-230. In some embodiments, a first code block 210 defines a first function, a second code block 220 defines a second function, a third code block 230 defines a third function, and so on.

According to an embodiment, an intent is determined for each code block. For example, in an embodiment, the first code block 210 is statically analyzed to determine what the intent of the first code block 210 is. In an embodiment, intent is a list of actions, functionalities, behaviors, and the like, which the first code block 210 is capable of performing. In an embodiment, an intent is determined for the code object 200 based on a determined intent for each of the plurality of code blocks.

Figure 3:
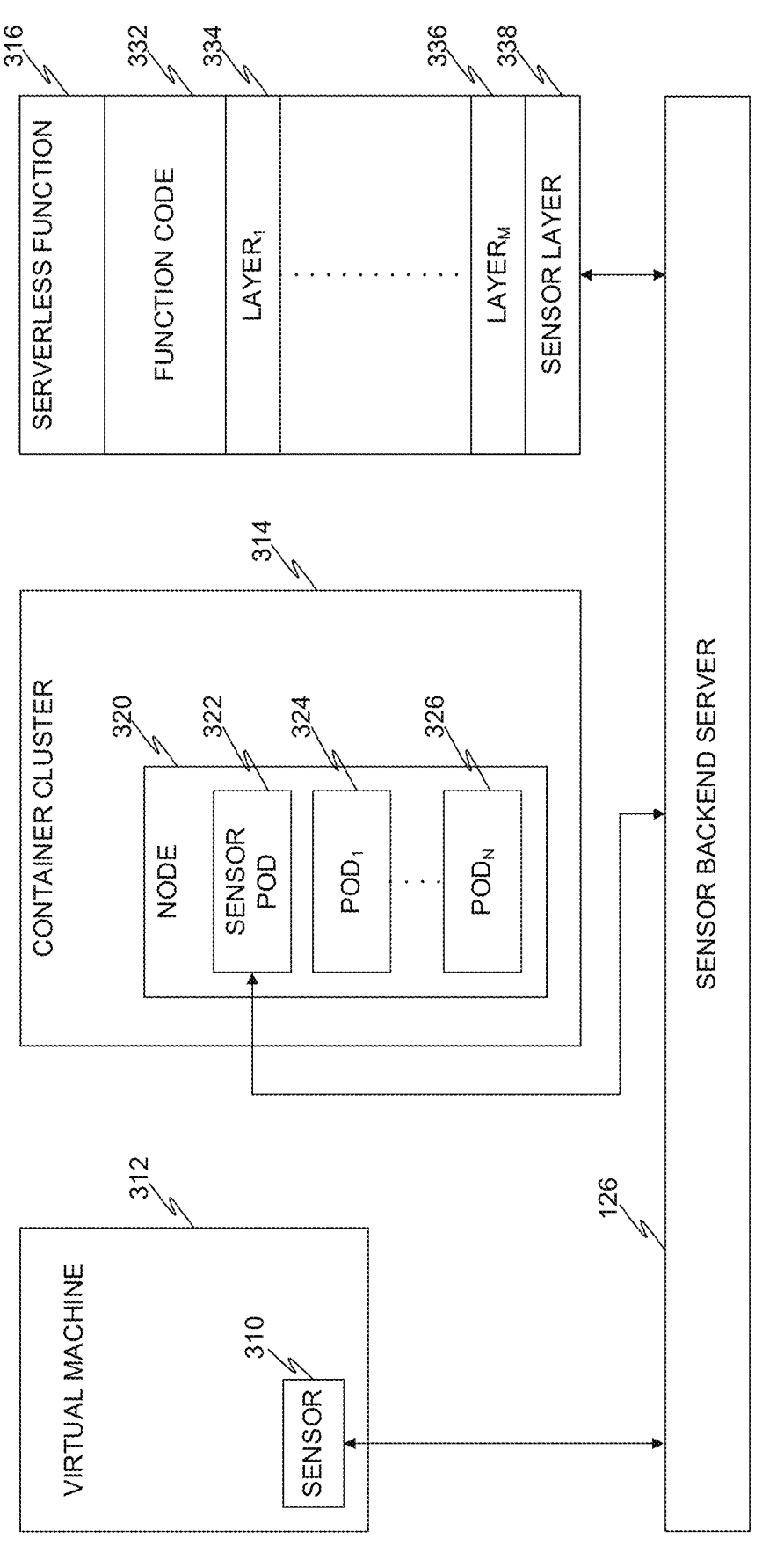
FIG. 3 is an example schematic illustration of a sensor backend server communicating with a plurality of sensors deployed on various workloads, implemented in accordance with an embodiment.

FIG. 3 is an example schematic illustration of a sensor backend server communicating with a plurality of sensors deployed on various workloads, implemented in accordance with an embodiment. In some embodiments, a sensor backend server 126 is configured to communicate with a machine (not shown) having a sensor installed thereon and communicatively coupled with the sensor backend server 126. In an embodiment, the machine is bare metal machine, a computer device, a networked computer device, a laptop, a tablet, and the like computing devices.

In an embodiment, a sensor backend server 126 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 312 includes a sensor 310. In an embodiment, the sensor 310 is deployed as a service executed on the virtual machine 312. In some embodiments, a virtual machine 312 is configured to request binary code, a software package, and the like, for example from a sensor backend sever 128, which when executed by the virtual machine 312 cause a sensor 310 to run as a service on the virtual machine 312. The sensor 310 is configured to listen to a data link layer communication, for example through an eBPF interface.

A container cluster 314 runs a daemonset, and includes a plurality of nodes, such as node 320. The daemonset ensures that each node 320 runs a daemonset pod 322, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 324 through pod-N 326, where 'N' is an integer having a value of '1' or greater. The daemonset pod 322 is configured, in an embodiment, to communicate with the sensor backend server 126.

A serverless function 316 includes, in an embodiment, a function code 332, and a plurality of code layers 1 through M (labeled respectively as 334 through 336), where 'M' is an integer having a value of '1' or greater. For example, in AWS Lambda a layer contains, in an embodiment, code, content, a combination thereof, and the like. In some embodiments, a layer, such as layer 334 includes runtime data, configuration data, software libraries, and the like.

In certain embodiments, the serverless function 316 includes a sensor layer 338. The sensor layer 338 is configured, in an embodiment, to listen to a data link layer communication of the serverless function 316, for example through an eBPF interface.

The sensor service 310, daemonset pod 322, and sensor layer 338 are each an implementation of a sensor, according to an embodiment. In an embodiment, a sensor is configured to communicate with a sensor backend server 126 through a transport layer protocol, such as TCP. For example, the sensor backend server 126 is configured, in an embodiment, to listen to a predetermined port using a TCP protocol, and a sensor, such as sensor 310, daemonset pod 322, and sensor layer 338 are each configured to communicate with the backend sensor server 126, for example by initiating communication using TCP over the predetermined port.

Figure 4:
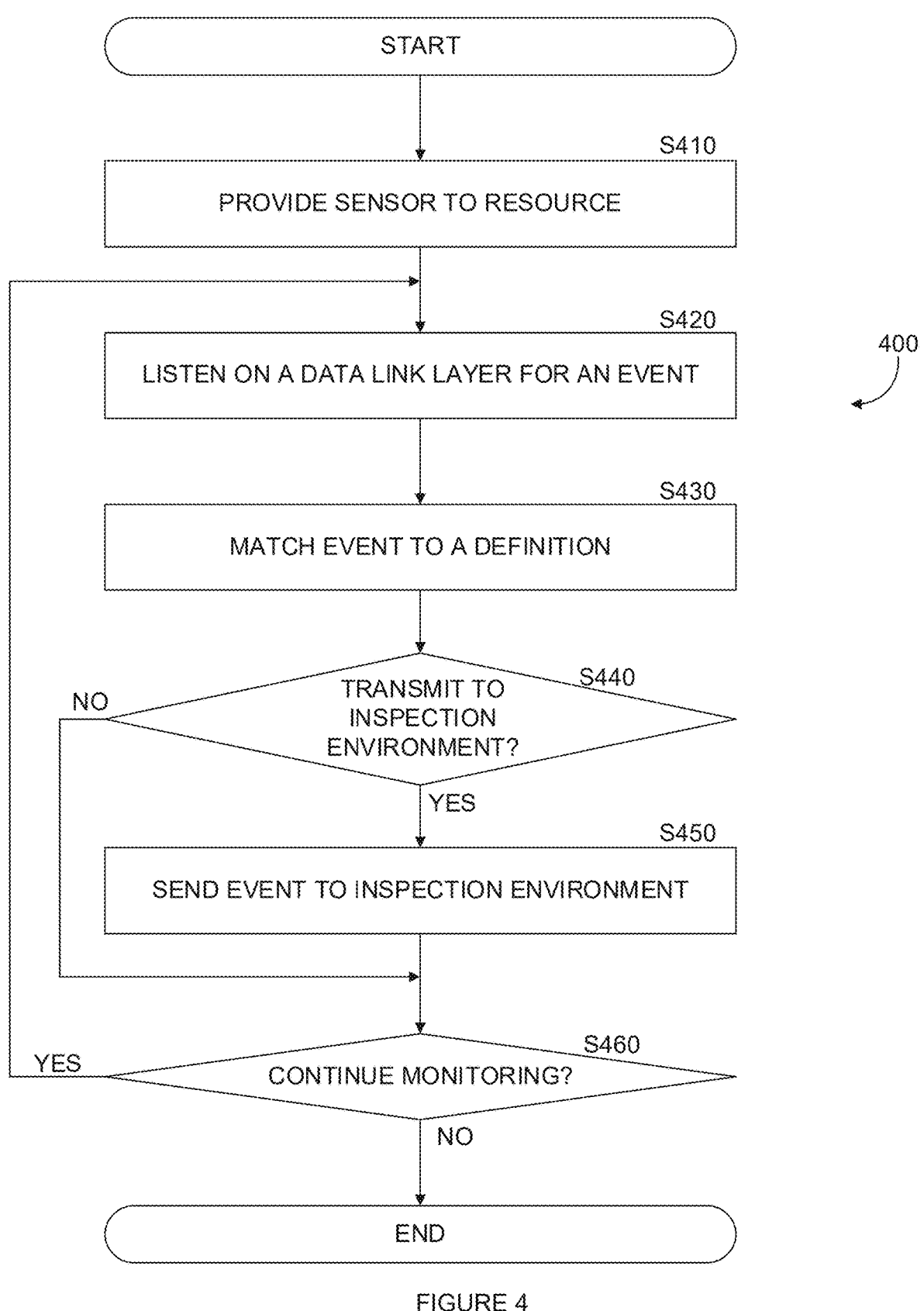
FIG. 4 is an example flowchart of a method for performing cybersecurity threat detection on a resource in a cloud computing environment, implemented in accordance with an embodiment.

FIG. 4 is an example flowchart 400 of a method for performing cybersecurity threat detection on a resource in a cloud computing environment, implemented in accordance with an embodiment.

At S410, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example, as detailed above. In an embodiment, a serverless function is provided with a sensor layer by providing a code, for example, in a .ZIP file.

In an embodiment, providing a sensor includes configuring a resource, such as a virtual machine, software container, serverless function, and the like, to receive software which, when executed, configures the resource to deploy a sensor thereon.

At S420, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1: "200f06c12975399a4d7a32e171caabfb994f78b9"
    modules {
        path: "/usr/lib/libresolv-2.32.so"
        last_seen: 1663138800
    modules {
        path: "/usr/lib/libpthread-2.32.so"
        last_seen: 1663138800
    }
    modules {
        path: "/usr/lib/ld-2.32.so"
        last_seen: 1663138800
    }
```

-continued

```
      modules {
          path: "/usr/lib/libc-2.32.so"
          last_seen: 1663138800
      }
      modules {
          path: "/usr/lib/libtirpc.so.3.0.0"
          last_seen: 1663138800
      }
      modules {
          path: "/usr/lib/libnss_files-2.32.so"
          last_seen: 1663138800
      }
      modules {
          path: "/usr/sbin/rpc.mountd"
          last_seen: 1663138800
      }
      listening sockets {
          ip_addr: "0.0.0.0"
          port: 60311
      }
      listening sockets {
          ip_addr: "0.0.0.0"
          port: 43639
      }
```

This portion of an SBOM indicates that a remote procedure call (RPC) is executed, which is configured to receive a client request to mount a file system.

At S430, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S440, a check is performed to determine if data should be transmitted to an inspection environment. In some embodiments, the check is performed by applying a rule to an event, and determining transmission based on an output of applying the rule. If 'yes', execution continues at S450, if 'no' execution continues at S460.

At S450, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S460, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S420. If 'no', in an embodiment execution terminates. In some embodiments, if 'no', another check is performed at S460, for example after a predetermined period of time has lapsed.

Figure 5:
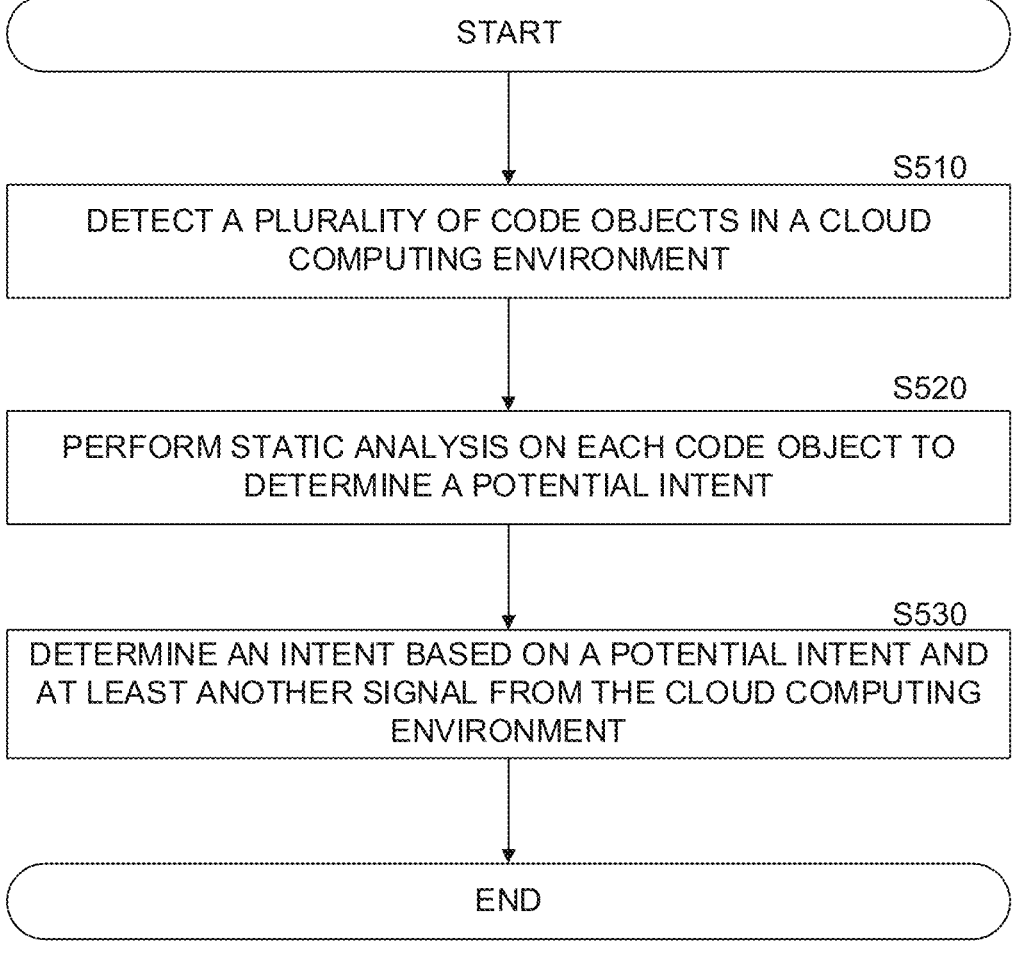
FIG. 5 is an example flowchart of a method for determining code intent in a cloud computing environment, implemented in accordance with an embodiment.

FIG. 5 is an example flowchart of a method for determining code intent in a cloud computing environment, implemented in accordance with an embodiment. In an embodiment, code intent is determined by statically analyzing a code object utilized for deploying a virtualization in a computing environment, such as a cloud computing environment.

At S510, a plurality of code objects are detected. In an embodiment, the plurality of code objects are detected each in a repository of a computing environment, such as a cloud computing environment. In an embodiment, a code object is a file, a configuration file, a declaratory code, a machine readable code, a human readable code, a combination thereof, and the like.

In an embodiment, the repository includes a version control system. In an embodiment, an inspection controller is configured to perform network discovery in a computing environment, and detect virtualizations deployed thereon. In some embodiments, the inspection controller is configured to detect a code object, and determine which virtualizations are deployed based on which detected code object(s). In certain embodiments, the method is performed only on detected code objects which correspond to a deployed virtualization. This can be done in order to conserve inspection resources, and reduce the number of code objects for which static analysis is performed.

According to an embodiment, a code object is detected by an inspector configured to detect the code object on a disk of a virtualization deployed in the computing environment. For example, in an embodiment, a virtualization, such as a virtual machine, includes a virtual disk. In an embodiment an inspectable disk is generated based on the virtual disk. In certain embodiments, the inspector is configured to inspect the inspectable disk for a code object. In an embodiment, an inspection controller is configured to generate the inspectable disk by cloning the virtual disk into an inspectable disk.

At S520, static analysis is performed on a detected code object. In an embodiment, each detected code object is statically analyzed to determine a potential intent. In some embodiments, a potential intent includes actions, software calls, functionalities, behaviors, and the like, which the code object, when executed, is capable of performing.

For example, according to an embodiment, a code object includes a function which is determined to generate an API call to a specific API path using an established domain, URL, and the like. In an embodiment, the API call is part of the potential intent. In other words, when the API call is detected in a cloud log, in runtime (e.g., by a runtime sensor), etc., it can be determined based on the intent that the software is performing a function which it is intended to perform.

According to an embodiment, static analysis includes examining code without executing it, to identify intent. In an embodiment, statically analyzing the code object includes parsing a source code to generate an abstract syntax tree (AST), an intermediate representation (IR), and the like. According to an embodiment, this allows for deeper inspection of code structure and logic.

In an embodiment, statically analyzing the code includes a lexical analysis. In some embodiments, the code is tokenized, followed by syntactic analysis to check for grammar violations. Semantic analysis then verifies type correctness, variable scope, and function usage. According to an embodiment, an inspector is configured to apply data flow and control flow analysis to detect issues such as uninitialized variables, unreachable code, and security vulnerabilities.

At S530, intent is determined for each code object. In an embodiment, intent is determined based on potential intent which is detected using static analysis, and at least another signal from the computing environment.

In an embodiment, the another signal is generated from a runtime sensor, a cloud log, a network log, an event log, a runtime execution data log, a combination thereof, and the like. For example, in an embodiment, a code object is determined through static analysis to include a potential intent which includes generating an API call. In some embodiments, an artifact of the API call is detected in a network log. In certain embodiments, the API call is detected through a runtime sensor deployed on a virtualization.

In an embodiment, the another signal is based on a virtualization deployed in the computing environment, wherein the virtualization is deployed in the computing environment based on the detected code object. In some embodiments, the another signal is based on a software application, which is executed in the computing environment based on the code object.

In certain embodiments, intent is determined based on correlating a potential intent with evidence of the intent executed in the computing environment. This allows, according to an embodiment, to distinguish between actions in the computing environment which originate from validated code objects, actions which do not originate from validated code objects, etc. In some embodiments, a cybersecurity policy is applied to an action in the computing environment (e.g., to an event record indicating the action occurred) which originated from unvalidated code, and a remediation action is initiated as a result.

In an embodiment, a remediation action, mitigation action, and the like, includes generating an alert, generating a ticket an in an issue tracking system, blocking deployment of a code object, blocking deployment of a virtualization, revoking access to a virtualization, revoking access from a virtualization, revoking access from a resource, a combination thereof, and the like.

Figure 6:
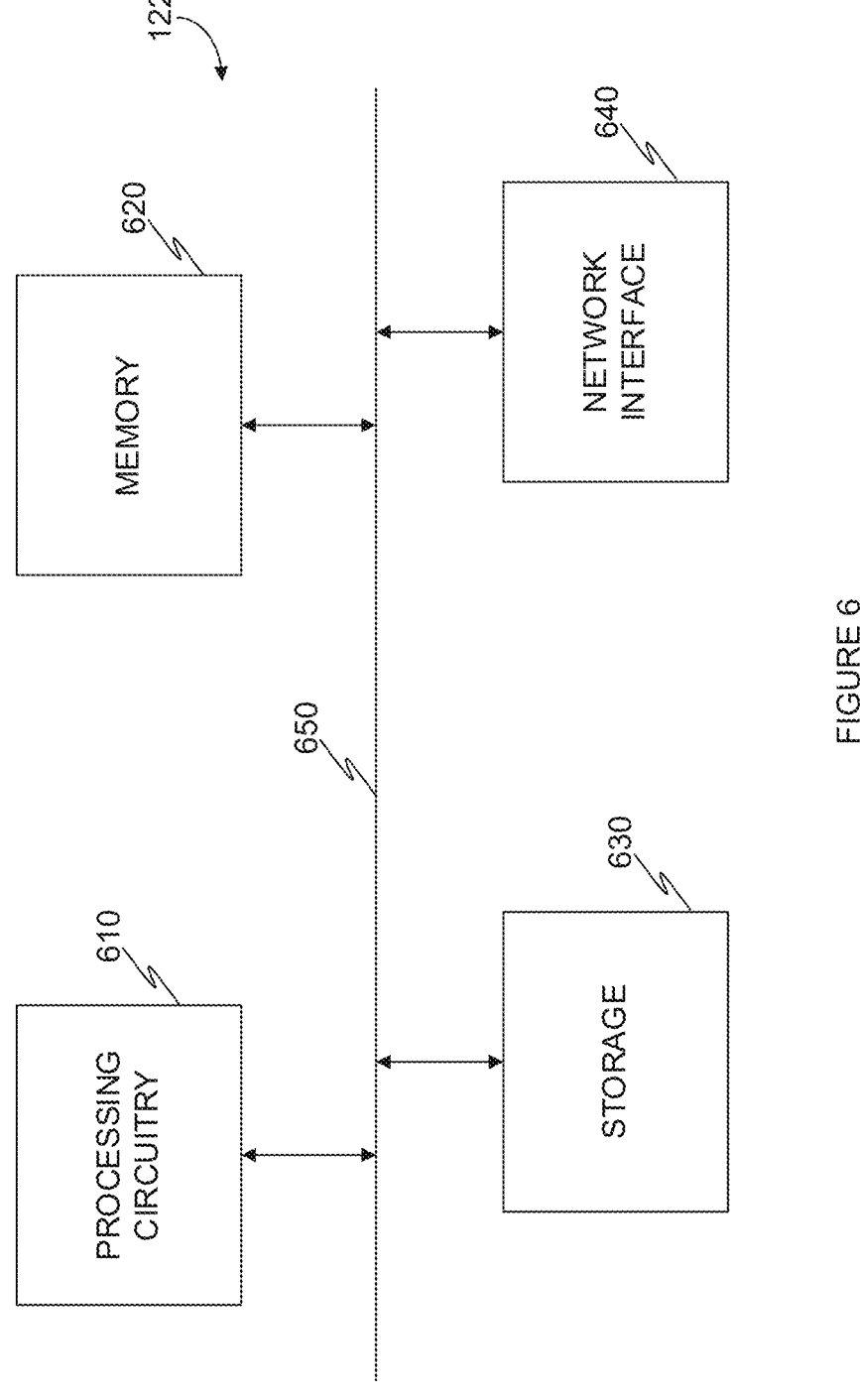
FIG. 6 is an example schematic diagram of a controller according to an embodiment.

FIG. 6 is an example schematic diagram of a controller 122 according to an embodiment. The controller 122 includes, according to an embodiment, a processing circuitry 610 coupled to a memory 620, a storage 630, and a network interface 640. In an embodiment, the components of the controller 122 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 620 is a volatile memory (e.g., random access memory, etc.), a non-volatile memory (e.g., read only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 640 is configured to provide the controller 122 with communication with, for example, the computing environment 110, according to an embodiment.

It should be understood that the embodiments described herein are not limited to the specific architecture illustrated in FIG. 6, and other architectures may be equally used without departing from the scope of the disclosed embodiments.

Furthermore, in certain embodiments the inspector 124, the sensor backend server, a combination thereof, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting code intent of code objects in a computing environment for assessing cybersecurity risk, comprising:

detecting, based on inspection of an inspectable disk, a plurality of code objects in a computing environment;

statically analyzing each code object of the plurality of code objects to determine a plurality of potential code intents, each potential code intent corresponding to an action;

generating a cybersecurity signal in the computing environment based on a plurality of event records;

detecting in the cybersecurity signal a first event corresponding to a potential code intent;

determining that the potential code intent is a code intent based on the detection of the first event corresponding to a potential code intent;

detecting in the cybersecurity signal a second event which does not correspond to any potential code intent; and initiating a remediation action in the computing environment based on the detected second event.

2. The method of claim 1, further comprising:

detecting the plurality of code objects in a code repository of the computing environment, wherein the code repository is configured to store a plurality of versions of each code object.

3. The method of claim 1, further comprising:

generating a call graph based on the static analysis of each code object of the plurality of code objects.

4. The method of claim 1, further comprising:

receiving an event from a runtime sensor, the runtime sensor deployed on a resource and configured to detect runtime event data on the resource; and generating the cybersecurity signal based on the received event.

5. The method of claim 1, further comprising:

detecting an event in a log of the computing environment; and generating the cybersecurity signal based on the detected event.

6. The method of claim 5, wherein the log is any one of: a cloud log, a network log, an event log, a runtime execution log, or any combination thereof.

7. The method of claim 1, further comprising:

detecting a resource in the computing environment, wherein the resource utilizes an application, the application based on a code object of the plurality of code objects;

determining that the second event is associated with the application based on an identifier of the application in a record of the second event; and determining that the second event does not correspond to any potential code intent associated with the code object of the application.

8. The method of claim 7, further comprising:

initiating the remediation action based on the application.

9. The method of claim 8, further comprising:

initiating the remediation action on the resource.

10. A non-transitory computer-readable medium storing a set of instructions for detecting code intent of code objects in a computing environment for assessing cybersecurity risk, the set of instructions comprising:

one or more instructions that, when executed by one or more processing circuitries of a device, cause the device to:

detect based on inspection of an inspectable disk, a plurality of code objects in a computing environment;

statically analyze each code object of the plurality of code objects to determine a plurality of potential code intents, each potential code intent corresponding to an action;

generate a cybersecurity signal in the computing environment based on a plurality of event records;

detect in the cybersecurity signal a first event corresponding to a potential code intent;

determine that the potential code intent is a code intent based on the detection of the first event corresponding to a potential code intent;

detect in the cybersecurity signal a second event which does not correspond to any potential code intent; and initiate a remediation action in the computing environment based on the detected second event.

11. A system for detecting code intent of code objects in a computing environment for assessing cybersecurity risk comprising:

one or more processing circuitries configured to:

detect, based on inspection of an inspectable disk, a plurality of code objects in a computing environment;

statically analyze each code object of the plurality of code objects to determine a plurality of potential code intents, each potential code intent corresponding to an action;

generate a cybersecurity signal in the computing environment based on a plurality of event records;

detect in the cybersecurity signal a first event corresponding to a potential code intent;

determine that the potential code intent is a code intent based on the detection of the first event corresponding to a potential code intent;

detect in the cybersecurity signal a second event which does not correspond to any potential code intent; and initiate a remediation action in the computing environment based on the detected second event.

12. The system of claim 11, wherein the one or more processing circuitries are further configured to:

detect the plurality of code objects in a code repository of the computing environment, wherein the code repository is configured to store a plurality of versions of each code object.

13. The system of claim 11, wherein the one or more processing circuitries are further configured to:

generate a call graph based on the static analysis of each code object of the plurality of code objects.

14. The system of claim 11, wherein the one or more processing circuitries are further configured to:

receive an event from a runtime sensor, the runtime sensor deployed on a resource and configured to detect runtime event data on the resource; and generate the cybersecurity signal based on the received event.

15. The system of claim 11, wherein the one or more processing circuitries are further configured to:

detect an event in a log of the computing environment; and generate the cybersecurity signal based on the detected event.

16. The system of claim 15, wherein the log is any one of: a cloud log, a network log, an event log, a runtime execution log, or any combination thereof.

17. The system of claim 11, wherein the one or more processing circuitries are further configured to:

detect a resource in the computing environment, wherein the resource utilizes an application, the application based on a code object of the plurality of code objects;

determine that the second event is associated with the application based on an identifier of the application in a record of the second event; and determine that the second event does not correspond to any potential code intent associated with the code object of the application.

18. The system of claim 17, wherein the one or more processing circuitries are further configured to:

initiate the remediation action based on the application.

19. The system of claim 18, wherein the one or more processing circuitries are further configured to:

initiate the remediation action on the resource.

* * * * *